Patented June 3, 1952

2,598,663

UNITED STATES PATENT OFFICE 2,598,663

COPOLYMERS OF UNSATURATED ALKYD RESINS AND ACRYLAMIDO COMPOUNDS

Edward L. Kropa, Old Greenwich, Conn., assignor to American Cyanamid Company, New York, N. Y., a corporation of Maine No Drawing. Original application October 31, 1946, Serial No. 707,043. Divided and this application April 21, 1948, Serial No. 22,494

14 Claims. (Cl. 154—43)

This invention relates to polymerizable compositions, to the polymerization of such compositions to form insoluble resins, and to the production of coating compositions, molding compositions, molded articles, laminated articles, etc., from the polymerizable compositions. Polymerizable compositions of this invention include a reactive alkyd resin and an organic substance, generally a reactive solvent. Upon reaction of these substances, a substantially insoluble resin is formed.

One of the objects of this invention is to prepare improved resins and especially to obtain clear and colorless gels.

It is also an object of this invention to provide potentially polymerizable solutions which would be stable during storage.

Still another object of this invention is to control the rate of polymerization of the reactive mixture, as well as to improve the properties and characteristics of resulting gels.

Another object of this invention is to prepare compounds particularly suitable for use as coating compositions and as components in coating compositions.

A further object of the present invention is to prepare molding compositions and especially to prepare clear and colorless molded materials.

Another object of this invention is to prepare laminated moldings having high strength and other desirable properties.

A still further object of this invention is to provide molding compositions suitable for injection molding. Other objects will be apparent from the description.

According to the present invention, I have found that substantially insoluble, substantially infusible resins may be prepared by means of the chemical reaction or polymerization of a mixture containing a resin possessing a plurality of polymerizably reactive alpha, beta-enal groups, i. e.

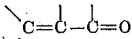

and an organic substance which contains an amido group

a polymerizably reactive $CH_2=C<$ group, and no conjugated carbon-to-carbon double bonds. Such mixtures may be utilized in coating compositions, in molding compositions, in laminating, in adhesives, in casting compositions, etc.

For the sake of brevity, the organic substances which contain the amido group and the polymerizably reactive $CH_2=C<$ group will be referred to herein as "reactive materials" or as "reactive materials containing the $CH_2=C<$ group," and they are thus to be distinguished from the resins which possess a plurality of polymerizably reactive alpha, beta-enal groups and which will be designated herein as "reactive resins" or as "unsaturated alkyd resins."

Among the reactive resins used in the practice of this invention for interaction with reactive materials containing $CH_2=C<$ groups are those which are derived from alpha, beta-unsaturated organic acids and, therefore, contain the reactive groupings present in these acids. The term "acids" as used herein is intended to include the anhydrides as well as the acids themselves, since the former may be used instead of the acid. The term "alpha, beta-unsaturated organic acid" as used in the art does not include acids wherein the unsaturated group is part of an aromatic-acting radical as, for example, phthalic acid, and the same definition is adopted herein.

Resins used in the practice of the present invention are preferably produced by the esterification of an alpha, beta-unsaturated polycarboxylic acid with a polyhydric alcohol, particularly a glycol. Although esterification of the acid with a polyhydric alcohol is perhaps one of the simplest, most convenient ways of obtaining a reactive resin, I am not precluded from using resins otherwise derived from alpha, beta-unsaturated organic acids. Reactive resins suitable for my invention are any of those containing a plurality of polymerizably reactive alpha, beta-enal groups.

A reactive resin such as one prepared by esterification of an alpha, beta-unsaturated organic acid and a glycol or other polyhydric alcohol is mixed with a reactive material containing the $CH_2=C<$ group. Upon adding a polymerization catalyst and subjecting the mixture to polymerization conditions such as, for example, heat, light, or a combination of both, a substantially insoluble, substantially infusible resin is obtained.

The invention will be described in greater detail in conjunction with the following specific examples in which the proportions are given in parts by weight. It should be understood that the examples are merely illustrative, and it is not intended that the scope of the invention be limited to the details therein set forth.

*Example 1*

20 parts of ethylene glycol fumarate sebacate (4:3:1 molar ratio) are mixed with 10 parts of methylene bis-acrylamide prepared by strong acid condensation of two moles of acrylamide with one mole of formaldehyde as described and claimed in the copending application of Lennart A. Lundberg, Serial No. 707,040 filed October 31, 1946 now Patent No. 2,475,846 dated July 12, 1949.

To 12 parts of the mixture prepared above are added 8 parts of wood flour filler and 2 parts of benzoyl peroxide containing 50% inactive filler (triphenyl phosphate). The resulting mixture is compacted by passage through cold rolls and disintegrated and this composition is then placed in a disk mold preheated to 160° C. and left there under pressure for about 15 minutes. The resulting molding is hard and well-cured.

*Example 2*

A pulverized mixture of 20 parts of ethylene glycol fumarate sebacate (4:3:1 molar ratio), 10 parts of methylene bis-acrylamide, and 0.3 part of benzoyl peroxide is spread evenly between 5 ply of ECC-11-112 Fiberglas cloth and the combination held under slight pressure in a Carver press for about 30 minutes at about 160° C. Where the Fiberglas cloth is well impregnated, the resin becomes hard and brittle and the panel stiff, the latter having Barcol readings averaging 26.

*Example 3*

The resin mixture of Example 2 is spread evenly between 6 ply of #720 paper and the combination subjected to the same curing conditions as the Fiberglas laminate of Example 2. The resulting panel is stiff with a Barcol hardness of 35.

*Example 4*

Example 1 is repeated using in place of the methylene bis-acrylamide, methylene bis-methacrylamide prepared by strong acid condensation of two moles of methacrylamide with one mole of formaldehyde as described and claimed in the copending application of Lennart A. Lundberg, Serial No. 707,040 filed October 31, 1946, now Patent No. 2,475,846 dated July 12, 1949. The resulting molding is uniformly well-cured.

*Example 5*

Example 2 is repeated using methylene bis-methacrylamide in place of methylene bis-acrylamide. The resulting Fiberglas laminate possesses a high modulus in bending and is found to have a Barcol hardness averaging 51.

*Example 6*

Example 2 is repeated using methylene bis-methacrylamide in place of methylene bis-acrylamide. The resulting paper laminate is well bonded and has a Barcol hardness of about 45-50.

*Example 7*

67 parts of diethylene glycol fumarate sebacate (6:5:1 molar ratio), 33 parts of acrylamide, 7 parts of paraformaldehyde, and 0.5 part of benzoyl peroxide containing 50% inactive filler (triphenyl phosphate) are thoroughly mixed together in a suitable vessel and then heated at 100° C.

A vigorous reaction occurs, accompanied by evolution of gas. As the mass polymerizes and sets, it undergoes about a twofold expansion and the cured mass is porous.

*Example 8*

To 70 parts of diethylene glycol fumarate sebacate (6:5:1 molar ratio), 10 parts of N-butyl acrylamide containing 0.3 part of benzoyl peroxide dissolved therein are added. The mixture is not compatible at room temperature.

The dispersion is cast as a flat sheet in a glass cell and cured for 2 hours at 60° C. and then 2 hours at 100° C.

The resulting cured resin sheet is clear and light-colored, and has a Barcol hardness of about 10.

All of the reactive materials suitable for reaction with a reactive resin according to my invention are characterized by the presence of the amido group

and the polymerizably reactive $CH_2=C<$ group, and none of them contains conjugated carbon-to-carbon double bonds. They may be represented by one or the other of the following general formulae:

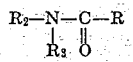

and

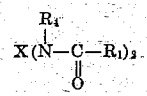

in which $R_1$ may be an unsaturated aliphatic radical containing at least one $CH_2=C<$ group and no conjugated carbon-to-carbon double bonds, R may be the same as $R_1$ or it may be an unsaturated oxyaliphatic radical containing at least one $CH_2=C<$ group and no conjugated carbon-to-carbon double bonds, $R_2$, $R_3$, and $R_4$ may be hydrogen or alkyl, alkylol, aryl, or aralkyl radicals, and X is an alkylidene radical. Still more particularly the reactive materials (that is, reactive acrylamido compounds) that are employed in practicing the invention herein claimed, are monomeric substances which are compatible and copolymerizable with the reactive resin (that is, a polymerizable unsaturated alkyd resin containing a plurality of polymerizably reactive alpha,beta-enal groups) and which are selected from the group consisting of compounds having the following general formulae:

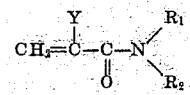

and

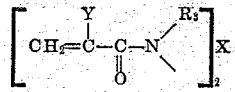

in which Y is a member of the group consisting of hydrogen and alkyl radicals of 1 to 2 carbon atoms, $R_1$ is selected from the group consisting of hydrogen and alkyl, alkylol, aryl and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical.

Compounds containing a conjugated system of carbon-to-carbon double bonds are known to react with themselves or with other unsaturated compounds such as the maleic esters by a 1,2 or 1,4 addition mechanism such as that which has become generally known as the Diels-Alder reaction. Compounds such as those used according to the present invention which contain no conjugated carbon-to-carbon double bonds obviously cannot undergo this type of reaction with the maleic esters. Accordingly, my invention is not directed to the use of unsaturated compounds containing conjugated systems of carbon-to-carbon double bonds. Many substances which contain a carbon-to-carbon double bond conjugated with respect to oxygen are suitable for use according to my invention since they do not react with unsaturated alkyd resins in an undesirable manner but, instead, copolymerize or interpolymerize to form substantially infusible, substantially insoluble resins.

Among the reactive materials which may be used in the present invention are esters of the lower unsaturated aliphatic alcohols such as allyl alcohol, its homologues, for example methallyl alcohol, its substitution products, for example chlorallyl alcohol, with carbamic acid, and mono- or di-N-substituted carbamic acids in which the substituent or substituents on the nitrogen atom may be alkyl, for example N-methyl carbamic acid, N-ethyl carbamic acid, N,N-dimethyl carbamic acid, etc., alkylol, for example, N-methylol carbamic acid, etc., aryl, for example N-phenyl carbamic acid, N,N-ditolyl carbamic acid, etc., or aralkyl, for example N-benzyl carbamic acid, N,N-dibenzyl carbamic acid, etc. Mixed acids such as N-ethyl-N-phenyl carbamic acid, N-phenyl-N-benzyl carbamic acid, and N-methyl-N-benzyl carbamic acid may also be esterified with an unsaturated aliphatic alcohol and the ester copolymerized with unsaturated alkyd resins according to the present invention. Copolymers of unsaturated alkyd resins with esters of carbamic acids are described and claimed in my copending application Serial No. 707,043 filed October 31, 1946, of which the present application is a division. The aforesaid application Serial No. 707,043 has now been abandoned in favor of my copending application Serial No. 246,883, filed September 15, 1951 as a continuation-in-part of said application Serial No. 707,043.

Acrylamide, its homologues, its substitution products, and the alkylidene-bis derivatives thereof may be used in the practice of the present invention. Suitable compounds of this type include acrylamide, methacrylamide, ethacrylamide, methylene-bis-acrylamide, methylene-bis-methacrylamide, ethylidene-bis-acrylamide, propylidene-bis-ethacrylamide, etc. The bis derivatives just mentioned are new chemical compounds and may be prepared by condensing a saturated lower aliphatic aldehyde with acrylamide, one of its homologues or one of its mono-N-substituted derivatives in a 1:2 molar proportion in the presence of strong acid as described and claimed in the copending application of Lennart A. Lundberg, Serial No. 707,040 filed October 31, 1946 now Patent No. 2,475,846 dated July 12, 1949. Moreover, mono- and di-N- substituted acrylamides such as N-methyl acrylamide, N,N-dimethyl acrylamide, N-ethyl methacrylamide, N-methylol acrylamide, N-phenyl acrylamide, N,N-ditolyl methacrylamide, N-benzyl methacrylamide, N,N-dibenzyl acrylamide, etc., may also be used in the compositions of the present invention as well as mixed substitution products, for example, N-methyl-N-benzyl acrylamide, N-phenyl-N-benzyl ethacrylamide, N-ethyl-N-tolyl acrylamide, etc.

The term "an acrylamide" as used in the present specification is intended to include acrylamide itself, its homologues such as methacrylamide, ethacrylamide, etc., and its substitution products including N-alkyl acrylamides, N-acyl acrylamides, and N-alkaryl acrylamides.

Reactive resins suitable for polymerization with reactive materials containing the $CH_2=C<$ group in accordance with the teachings of my invention are those which contain a plurality of alpha,beta-enals groups. The simplest members of this group are those produced by the esterification of an alpha,beta-unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired or if optimum electrical properties be desired, it is preferable to use glycols which do not have any oxygen bridges in their structure, since the presence of oxygen linkages may lead to the formation of color bodies during the preparation of the resin. By the use of glycols which do not contain the oxygen bridges, clear colorless resins may be produced. On the other hand, oxygen bridges may be desirable if the resin is to be used in coating as they cause films to dry faster.

The particular choice of glycol or other polyhydric alcohol used in preparing the resin is governed mainly by the desired physical properties of the intermediate and final polymerization products, especially hardness, impact resistance, distensibility, refractive index, adhesion, compatibility relationships, etc., including also solvent, water, alkali, acid, or chemical resistance in general.

The alpha,beta-unsaturated organic acids which I prefer to use in preparing the reactive resins include maleic, fumaric, itaconic, and citraconic, although other similar acids could be substituted such as mesaconic acid, aconitic acid, and halogenated maleic acids, such as chlormaleic acid, and any of the foregoing could be substituted in part by acrylic, beta benzoyl acrylic, methacrylic, Δ1-cyclohexene carboxylic, cinnamic, and crotonic acids. Obviously, various mixtures of these acids can be used where expedient.

The reactive resins may be modified with other substances which are used in alkyd resins, i. e., monohydric alcohols, monobasic acids, or dibasic acids, e. g., phthalic acid, succinic acid, glutaric acid, adipic acid, azelaic acid, sebacic acid, etc., which do not contain groups polymerizably reactive with respect to organic substances containing $CH_2=C<$ groups. The modifying agents are usually used as diluents or plasticizers, chemically combined in the resin. The use of a small proportion of the saturated dibasic acids generally improves the mechanical properties of the resins after copolymerization with the material containing the $CH_2=C<$ group.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha,beta-unsaturated organic acids. Consequently, it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing a $CH_2=C<$ group. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizably active groups with respect to organic substances containing the $CH_2=C<$ groups be used, the proportion of such substance will depend on the properties required of the polymerized reactive material-reactive resin mixture. By the use of a relatively large proportion of a polymerizably active dibasic acid, e. g., maleic, in the reactive resin, a hard, tough polymer is produced upon subsequent reaction of said reactive resin with a reactive material containing the $CH_2=C<$ group. On the other hand, if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymerization with a reactive material containing the $CH_2=C<$ group. The same effect is produced by the introduction of other inactive ingredients. By varying the ingredients and the proportions of the ingredients, resins may be obtained having properties desirable for almost any particular use.

The unsaturated alkyd resins employed in accordance with my invention are preferably those having an acid number not greater than 50, although in some cases resins having an acid number as high as 100 may be desirable. Generally the acid number should be as low as possible, but this is sometimes controlled by practical considerations of operation such as time, temperature, and economy.

The resins should be so formulated that the carboxyl groups of the acids are reacted with the theoretical molar equivalent of the hydroxyl groups of the alcohols. In this connection it is to be noted that the hydroxyl groups of modifying alcohols as well as the carboxyl groups of modifying acids should be included with the hydroxyl groups and carboxyl groups of the principal reactants, the polyhydric alcohol and the alpha,beta-unsaturated polycarboxylic acid, respectively.

When glycols are reacted with dicarboxylic acids it is preferable that the glycol be present in a molar ratio to the acid of not less than 1:2 and that the molar ratio of monohydric alcohol to dicarboxylic acid be not greater than 1:1. In most cases it has been found that a molar ratio of monohydric alcohol to dicarboxylic acid of 1:6 produces the best results (5.5 moles of glycol being employed in this case). The same general rules apply when polyhydric alcohols other than glycols such as pentaerythritol, dipentaerythritol or polyallyl alcohols are used, or when other polycarboxylic acids having more than two carboxylic groups are used. In other words, the ratio of the monohydric alcohol to the polycarboxylic acid should preferably be not greater than 1:1 although higher ratios of monohydric alcohol may be employed if desired. However, for optimum results the ratio of monohydric alcohol to polycarboxylic acid should not exceed 1 mole of monohydric alcohol for each carboxylic group of the polycarboxylic acid in excess of 1. Thus, for example, a resin may be prepared by the reaction of 1 mole of dipentaerythritol with 5 moles of fumaric acid and 4 moles of monohydric alcohol.

If it is desirable to introduce lower alkyl groups into the resin, this may be done by using maleic esters of monohydric alcohols, e. g., ethyl maleate. The alkyl ester will then be united with the resin by polymerization. This could not be accomplished with the saturated type of alkyd, e. g., phthalic acid esters of polyhydric alcohols.

Resins which contain a plurality of alpha,beta-enal groups are sensitive to light, heat, and polymerizing catalysts. Since oxygen tends to cause these resins to polymerize, it is desirable that the resins should be made in in the absence of this substance, especially when colorless resins are required. The exclusion of oxygen and polymerizing catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

In order to keep oxygen from contact with the reactants, an inert gas such as carbon dioxide or nitrogen may be introduced into the reaction chamber. This may be done either by merely passing the gas over the surface or by bubbling the gas through the liquid reactants. In the latter instance, it may be made to perform the added function of agitating the mixture, thus eliminating the necessity for mechanical agitation. The inert gas will also carry away at least part of the water formed, and toward the end of the reaction it can be used to carry away the reactants still remaining unreacted. Upon separation of the water vapor the used carbon dioxide or other inert gas would be particularly suitable for making high grade colorless resins since any residual reactive impurities such as oxygen would have been removed in its passage through the first batch of resin reactants.

The effect of light is not so important if the reactants are purified and the reaction carried on in an inert atmosphere, as outlined above. However, as an added precaution the esterification may be conducted in the dark. It is also advisable to avoid local overheating, and discoloration is minimized if the reaction is conducted below a temperature of about 200° C. To avoid overheating it is advisable to raise the temperature slowly at the beginning, especially if an anhydride be used since the reaction between an anhydride and an alcohol is exothermic.

The following reactive resins are among those which may be used according to the process of the present invention with the polymerizably reactive amide compounds: ethylene glycol fumarate, diethylene glycol fumarate, alpha propylene glycol maleate, polyethylene glycol maleates, (e. g., hexaethylene glycol maleate), polymethylene glycol maleates (e. g., decamethylene glycol maleate), octadecandiol fumarate, the maleic esters of 2,2-dimethyl propanediol-1,3, glycerol maleate undecylenate, triethylene glycol chlormaleate, triethylene glycol terpene maleate (derived from the interaction of ½ mole of terpene and 1 mole of maleic in the presence of an excess of terpene).

Many different modified alkyd resins may be employed. Such modified resins include all of those previously mentioned and generally described as modified with a monohydric alcohol or with a monocarboxylic acid or with both a monohydric alcohol and a monocarboxylic acid. Among the alcohols which may be used are n-butanol, 1,2 and 1,3-dichloropropanols (HO—CH₂—CHCl—CH₂Cl and CH₂Cl—CHOCH₂Cl), the amyl alcohols, cyclohexanol, n-hexanol, 2-methyl hexanol, n-octanol, decanol, dodecanol, tetradecanol, cetyl alcohol, octadecanol, reduced geraniol, reduced fatty oils such as coconut oil, palm oil, etc., benzyl alcohol, phenylethyl alcohol, furfuryl alcohol, tetrahydrofurfuryl alcohol, and various ether alcohols such as

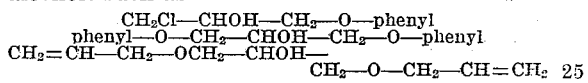

and those sold under the trade name of "Cellosolve" and "Carbitol," such as butyl "Cellosolve" (the monobutyl ether of ethylene glycol), butyl "Carbitol" (the monobutyl ether of diethylene glycol), etc. Furthermore, various monohydric alcohols may be reacted with glycidol and the reaction products thereof employed as a glycol in the preparation of the unsaturated alkyd resins. Of the cycloaliphatic alcohols, those derived by reaction of dienes with unsaturated aldehydes followed by reduction such as isohexyl cyclohexyl carbinol which is obtained by reducing the reaction product of beta myrcene with acrolein, are especially suitable. Various acids and other compounds having esterifiable hydroxyl groups may be employed in the modification of the unsaturated alkyd resins to be used in accordance with my invention for copolymerization with allyl compounds. Thus, for example, the hydroxy acids may be employed, including lactic acid, alpha-hydroxydecanoic acid, omega-hydroxymyristic acid, etc. Other substances containing hydroxyl groups which may be used are, for example, ethylene cyanohydrin. Still other alcohols which may be employed are terpineol, fenchyl alcohol, and the unsaturated alcohols including allyl alcohol, methallyl alcohol, oleyl alcohol, linoleyl alcohol. I have found that copolymers of alkyd resins modified with monohydric alcohol give especially high temperature resistance when employed as a bond to laminate glass cloth or when glass fibers are used as a filler in castings or moldings.

It is preferable that primary alcohols be used as modifiers for the unsaturated alkyd resins, and it is also preferable that such alcohols have boiling points above about 200° C. If low boiling alcohols, e. g., tetrahydrofurfuryl alcohol, be used, it is preferable that the resin be prepared azeotropically as described below.

Since the viscosity of the resin frequently becomes quite high if the esterification is carried to a low acid number, it may be desirable to produce the resin under azeotropic conditions. Accordingly, the esterification is conducted in an organic solvent which dissolves the reactants as well as the resultant resin and which is preferably substantially insoluble in water. Examples of these are: benzene, toluene, xylene, chloroform, carbon tetrachloride, ethylene dichloride, propylene dichloride, ethylene and propylene trichlorides, butylene dichloride and trichloride, and also higher boiling solvents such as cresol and methyl cyclohexanone although some of these may tend to darken the resin. The mixture is refluxed in such a manner as to separate the water formed by the esterification. Much lower temperatures are used than are used under the conditions outlined in the examples. Suitable temperatures range between 90°–145° C., for example, for the boiling members of the group of solvents set forth above. Obviously, this will vary with different solvents and with different concentrations of solvent. The range of preferred concentrations for the inert solvent is from about 25% to about 50%. An esterification catalyst is usually necessary because comparatively low temperature is employed. Examples of these are thymol sulfonic acid, d-camphor sulfonic acid, naphthalene sulfonic acid, and p-toluene sulfonic acid. Obviously, other known esterification catalysts could be used. A resin having any particular acid number, if made azeotropically, will usually have a lower viscosity than one of the corresponding acid number not made azeotropically.

Monocarboxylic acids which are saturated may be employed as modifiers for the unsaturated monocarboxylic acids heretofore mentioned. Such acids include acetic acid, caproic acid, lauric acid, stearic acid, etc. Any of the monocarboxylic acids which are available in the form of the anhydride may be used as the anhydride instead of as the acid.

The polymerization catalysts include the organic superoxides, aldehydic and acidic peroxides. Among the preferred catalysts there are: the acidic peroxides, e. g., benzoyl peroxide, phthalic peroxide, succinic peroxide, and benzoyl acetic peroxide; fatty oil acid peroxides, e. g., coconut oil acid peroxides, lauric peroxide, stearic peroxide, and oleic peroxide; alcohol peroxides, e. g., tertiary butyl hydroperoxide usually called tertiary butyl peroxide, and terpene oxides, e. g., ascaridole. Still other polymerization catalysts might be used in some instances such as soluble cobalt salts (particularly the linoleate and naphthenate), p-toluene sulfonic acid, aluminum chloride, stannic chloride, and boron trifluoride.

The term "polymerization catalyst" as used in this specification is not intended to cover oxygen contained in the resin as an impurity. While this small amount of oxygen would only catalyze the reaction to a very small extent, in order to eliminate any ambiguity the term "polymerization catalyst" is specifically defined as excluding any oxygen present as an impurity in the resin itself.

The concentration of catalyst employed is usually small, i. e., for the preferred catalysts from about 1 part catalyst per 1000 parts of the reactive mixture to about 2 parts per 100 parts of the reactive mixture. If an inhibitor be present, up to 5% or even more of catalyst may be necessary according to the concentration of inhibitor. Where fillers are used which contain high concentrations of substances which act as inhibitors, e. g., wood flour, the concentration of catalyst necessary to effect polymerization may be well above 5%.

One of the difficulties in the use of the compositions described above is that they are not susceptible to storage in the mixed form because polymerization will usually take place even at room temperature within a comparatively short time. Moreover, when it is desired to cure the compositions very rapidly under heat and pressure, the reaction becomes at times so vigorous that it cannot be controlled. In order to overcome these difficulties, it has been found advisable to incorporate a small proportion of a polymerization inhibitor in the mixture of resin and reactive material. When it is desired to use this mixture, a small percentage of the polymerization catalyst is added sufficient to overcome the effect of the inhibitor as well as to promote the polymerization. By careful control of the concentrations of inhibitor and catalyst, a uniform product with a good reaction velocity is obtainable. Upon subjection of this mixture to polymerization conditions such as heat, light, or a combination of both, with or without pressure, an infusible, insoluble resin is produced which has many more desirable characteristics than the resins produced by the polymerization of mixtures not containing the polymerization inhibitor such as, for instance, the lack of fracture.

Suitable polymerization inhibitors for this reaction are phenolic compounds, especially the polyhydric phenols, and aromatic amines. Specific examples of this group of inhibitors are hydroquinone, benzaldehyde, ascorbic acid, isoascorbic acid, resorcinol, tannin, sym. di-beta naphthyl-p-phenylene diamine, and phenolic resins. Sulfur compounds are also suitable.

The concentration of inhibitor is preferably low, and I have found that less than about 1% is usually sufficient. However, with the preferred inhibitors, I prefer to use only about 0.01% to about 0.1%.

The inhibitor may be incorporated in the reactive resin-reactive material combination (either before or after bodying), or it may be added to the original reactive resin before or during the esterification of the said reactive resin. By adding the inhibitor before the esterification, it is sometimes possible to use an inhibitor which would otherwise be substantially insoluble in the reactive resin-reactive material composition. By adding the inhibitor to the unesterified mixture, the inhibitor may become bound into the resin upon subsequent esterification.

The polymerizable compositions of the present invention may be polymerized in the presence of heat or light, or a combination of both. Ultraviolet light is more effective than ordinary light. The optimum temperature of conversion depends somewhat on the boiling point of the reactive material and on the pressures used. For example, at atmospheric pressure as in coating and casting operations, a temperature near or above the boiling point of the reactive material is unsuitable in most instances since substantial amounts of the reactive material will be lost by evaporation before the reaction between the resin and reactive material is complete. Accordingly, a temperature between room temperature, about 20°–25° C., and the boiling point is usually employed when a polymerization of this nature is carried out. The rate of polymerization doubles for about each 10° (C.) rise in temperature for this reaction. A temperature is selected which will give a suitable reaction rate and yet not cause substantial volatilization. Obviously, it will be necessary to use lower temperatures if large or very thick pieces are being cast because of the exothermicity of the reaction and the poor heat conductivity of the reaction mixture.

Where suitable precautions are taken to prevent evaporation of my reactive material or where pressure molding is used, higher temperatures than those mentioned above can be used. Since the time of curing is desirably much shorter in pressure molding, and since the reactive material containing the $CH_2=C<$ group would therefore not be lost so easily, a higher temperature is preferred.

The particular reactive resin, reactive material, and catalyst combination is selected according to the type of product desired, taking into account the solubilities of the reactants as well as the character of the resulting gels. Some combinations of reactive resins and reactive materials result in opaque gels while others give clear products in the gel state. Obviously, for many purposes an opaque gel may be used equally as well as a clear gel.

If the unsaturated alkyd resin be incompatible with the reactive amido material, chemical interaction of the type described cannot occur. Under these conditions, a solvent may be introduced as an additional constituent. If the solvent is inert, it plays no part in the reaction but is so selected that both the reactive material and the resin are soluble, yielding a homogeneous system of reactive material, inert solvent and resin. This invention relates to compatible combinations of a reactive resin and a reactive material containing a $CH_2=C<$ group. Such combinations may be obtained by the use of inert blending solvents where necessary although the use of only reactive materials containing the $CH_2=C<$ group which act as solvents is preferred.

The terms "compatible" and "homogeneous" as used in the specification and claims are intended to indicate a system, the constituents of which are uniformly distributed throughout the whole mass, and when applied to solutions, to indicate that they may be either true solutions or colloidal solutions as long as they are substantially stable.

When a reactive resin and a reactive material containing the $CH_2=C<$ group undergo chemical reaction, certain possibilities arise. The reactive resin and reactive material may combine in such a manner as to lead to the formation of a resinous colloidal entity, and the end-product is clear, glass-like, and homogeneous. Alternatively, the reactive resin and the reactive material may interact in such a manner as to yield colloidal entities wherein varying degrees of opacity or colloidal colors result. The end-product under these conditions may be partially translucent or opaque.

The final resin composition is obtained by reacting a resin containing the alpha,beta-enal

groups with a reactive material containing the group $>C=CH_2$. The chemical reaction which is believed to take place is a combination of the reactive material with the resin at the points of unsaturation, yielding a less unsaturated system which is essentially insoluble and infusible. Ordinarily when a resin is dissolved in a solvent, the changes which occur are physical in nature. The resin may be isolated from the solvent mixture chemically unchanged. In the present invention, however, the combination of the reactive material containing the $CH_2=C<$ group and the reactive resin become an inseparable entity, the original ingredients not being capable of being removed by solvents for the original ingredients.

Through the use of a small amount of reactive alkyd resin in conjunction with a large amount of reactive material containing the $CH_2=C<$ group, the final composition contains not only the ester groupings which were originally present in the alkyd resin, but also the carbon-to-carbon molecular bonds which link the reactive material and the reactive resin. Through the use of a small amount of resin and a large amount of reactive material, the composite resin is no longer soluble in those inert solvents wherein the reactive material resinified alone would dissolve. Under long exposure to the inert solvent the composite resin will tend to imbibe a certain quantity of inert solvent, but it does not possess the solubility of the reactive material when resinified alone. This property is a distinct advantage in that the physical contour of an object made of the polymerized resin is not lost through solution.

Comparison of the softening point of the reactive material containing the $CH_2=C<$ group alone and of the softening point of the composite resin formed through interaction of the resin and reactive material shows that the softening point of the latter has been raised. The softening point may be increased very markedly depending upon the ratio of resin used in the composition.

In general the softening point of resins has a distinct bearing on their behavior at room temperature as well as at elevated temperatures. Where the softening point is too low, difficulty is encountered in that articles made from the resin slowly lose their shape. In large articles, the effect becomes very noticeable. A softening point when too high, on the other hand, results in a composition which will not soften sufficiently in a mold. Roughly, three types of compositions exist with respect to the ratio of resin to reactive material containing the $CH_2=C<$ group. First, a large amount of reactive material and a small amount of resin; second, substantial quantities of both ingredients; third, a large amount of resin and a small amount of reactive material. The second composition when fully cured possesses no softening point. The first and third varieties of composition when cured may, under high temperatures and pressure, be made to flow slightly.

The composition obtained from substantial quantities of both reactive material containing the $CH_2=C<$ group and reactive resin in the cured state may be machined, turned on a lathe, sanded, and polished, and used in general as a turnery composition. The absence of softening renders the material particularly adaptable to this purpose. In that it is unflowable, it may be machined without danger of softening and gumming tools. Moreover, such a composition may, if desired, be obtained in large blocks.

My resins may be utilized in: moldings, with or without filler; laminated materials as the bonding agent; adhesives; coating compositions for use in finishes for wood, metals, or plastics, or in the treatment of fibrous materials such as paper, cloth, or leather; as impregnating agents for fibrous materials; as assistants in dyeing, etc.

In order to use the composition for moldings, it may be necessary to prevent the composition from curing too fast. During the change to a hard resin, varying stages of hardness exist and by interrupting the reaction at a definite point, the material may then be placed in a form and hardened under heat. Sheets of resin may be twisted or made to conform to a pattern and then subsequently cured in the shaped form by heat alone.

One manner in which this may be accomplished is to polymerize the reactive resin and reactive material containing the $CH_2=C<$ group without catalysts until the material is completely cured. By grinding this partially polymerized material, a molding composition is obtained which can then be shaped under heat and pressure.

To produce moldings or laminated materials, combinations of reactive resin and reactive material containing the $CH_2=C<$ group may be mixed with one or more of the various fillers, e. g., wood flour, wood fiber, paper dust, clay, diatomaceous earths, zein, glass wool, mica, granite dust, silk flock, cotton flock, steel wool, silicon carbide, paper, cloth of any fiber including glass, sand, silica flour, white, black or colored pigments, etc. Such mixtures may be partially polymerized, ground, and molded. On the other hand, the composition may be bodied and introduced directly into a mold and polymerization to a solid resin conducted in one step.

The composition of reactive resin and reactive material may be used for impregnating various porous objects or it may be employed as a coating composition.

If the polymerizable compositions are to be molded under low pressure (e. g. 0–50 lbs./sq. in.), the composition may be employed without bodying or partial polymerization.

The polymerizable mixture may be introduced in a positive mold without any filler. In this instance, however, the reaction becomes quite exothermic but this may be conveniently controlled by the addition of a suitable polymerization inhibitor.

The ratio of reactive material containing the $CH_2=C<$ group to reactive resin in the final composition will not only have a bearing on the softening point and on methods of working the resin, but on various other physical properties, e. g., light transmission, scratch resistance, indentation hardness, and arc resistance. By a judicious selection of the ratio of reactive material to reactive resin a composition best suited to these varying needs of industry may be fabricated.

The methods by which the reactive material containing the $CH_2=C<$ group may be made to combine are various. Heat, light, or catalysts may be used or combinations of these, or a combination of heat and pressure. Any suitable method of heating may be used including the application of high frequency electric fields to induce heat in the reactive mixture to polymerize the latter.

During the transformation to a hard massive structure, various stages occur which may be roughly separated as follows: first, the induction period wherein the material remains as a sol which slowly increases in viscosity; secondly, the transformation of the sol into a gel; and third, the hardening of the gel. During the transformation of the sol to a gel, an exothermic reaction occurs which may be very violent if uncontrolled. Moreover, the gel has relatively poor heat conductivity resulting in poor transfer not only of external heat but of the heat that is generated during chemical reaction throughout the mass. Cognizance has to be taken of these features in the hardening of the composition, particularly in the casting or molding of large blocks.

Light, when used alone, causes a relatively long induction period and during the transformation of the sol to the gel requires cooling to overcome the exothermic reactions especially when a powerful source of light is used for final curing. Using heat alone, gelation occurs readily enough at appropriate temperatures but since the gel, when formed, has poor heat conductivity, fracturing may occur in the last stage. Through the use of heat and catalyst, the reaction may become very violent unless the heating is carefully controlled.

Various combinations of these three factors may be used to bring about hardening of the mass. Mild heating of the reactive resin and reactive material containing the $CH_2=C<$ group, with or without inhibitors, brings about a very gradual increase in viscosity which may be controlled quite easily and readily. When the solution has taken on an appropriate consistency, then accelerators may be introduced and heating conducted at a very much lower temperature. Mild heating may first be used and the mass then exposed to light. Use of superoxides and light is very effective. In other words, through the use of initial heating or bodying, the induction time may be decreased markedly.

Four types of polymerizable compositions can, in general, be made up according to the present invention. In the first case, both the reactive resin and the reactive material containing a $CH_2=C<$ group may be liquid. Alternatively, the reactive resin may be solid and the reactive amido compound liquid or the resin may be liquid and the reactive material solid. Finally, both components may be solid. All of these types of compositions can be used in casting when sufficient heat is supplied to render all of the materials liquid. Similarly, the crystalline materials may be melted and while they are in the molten condition, used to impregnate cloth or fabric. The advantage of using two solid components in the resin is that the composition can be mixed with fillers and the catalyst and be kept in the solid condition. Under heat and pressure in a mold the crystaline material melts and is cured with the filler. In coating applications an organic liquid which is capable of dissolving both components can be used to dissolve the resinous composition. After application the volatile organic liquid can be removed.

The wide divergence of the properties of compositions of the present invention which contain a reactive resin and a reactive material containing the $CH_2=C<$ group enables them to be used in a variety of different ways. In liquid form or as solutions they may be used as adhesives, impregnating agents, or as surface coatings. Such an adhesive, for example, can be used for bringing diverse substances together—wood, metal, glass, rubber, or other resinous compositions such as phenolic or urea condensation products. As a surface composition in the liquid form, softening agents, cellulose ethers or esters could be added as well as natural or artificial resins, and the hardening brought about with light or through catalysts such as cobalt salts, oxygen liberating substances, etc. Since these compositions dry from the bottom rather than from the top, the latter frequently remains tacky for a relatively lengthy period. In order to overcome this, drying oil fatty acids, e. g., linseed oil fatty acids, are added to the esterification mixture in making the original reactive resin and this will cause the top surface to dry quickly upon subsequent polymerization with a reactive material containing the $CH_2=C<$ group. In this way a coating composition is obtained which dries both from top and bottom.

The resinous composition, moreover, may be cast or molded and after hardening may be isolated as a finished product, or it can be cut, turned and polished into the desired finished product. Provided the surface of the mold is highly polished, the resinous substance acquires a clear, smooth finish from the mold. The compositions so obtained, being insoluble, are not easily attacked by solvents and, being infusible, may be worked with ordinary wookworking or metal tools. The artifical mass can be cut, turned on a lathe, polished and sanded without superficial softening and streaking.

Obviously, natural resins or other synthetic resins may be admixed with the resins of this invention in order to obtain products suitable for particular purposes. Examples of these are shellac, cellulose esters and ethers, urea resins, phenolic resins, alkyd resins, ester gum, etc. The resins of my invention may also be mixed with rubber or synthetic rubber-like products if desired.

Since many of these resins are originally transparent and free of color, they may be colored with suitable dyes to a wide variety of transparent soft pastel shades. An example of a suitable dye is Sudan IV. Darker shades may be obtained if desired, e. g., with nigrosine.

It may be desirable in some instances to form a copolymer of one or more substances containing the group $CH_2=C<$ and at least one polymerizable unsaturated alkyd resin and, after molding or casting this into any desired shape, to apply a coating of a harder copolymer to the outside, thus obtaining the same effect as is obtained in the metallurgical fields by case hardening. Similarly, inserts may be filled with a hard resin in order to act as bearing surfaces or for some other purpose. Such coatings or inserts adhere tenaciously and appear to become integral with the original piece. In order to secure the best results in manufacturing such products, it is desirable to first abrade the surface of the article before the application of the harder film. During the curing operation, the abrasion marks disappear. This treatment is also of considerable importance since it may be used to refinish articles which might have been marred in use.

Many of the advantageous properties of the resin resulting from the polymerization of mixtures containing reactive materials containing the $CH_2=C<$ group and reactive resins are apparent from the foregoing disclosure. Several important advantages are now to be set forth.

In molding and casting operations curing takes place either in the presence or absence of air very rapidly. This is of great importance in curing large blocks. Other alkyd resins require a very much longer time to cure in large blocks, i. e., many months, whereas the compositions of a reactive resin and reactive material containing the $CH_2=C<$ group require only a few days at the most.

Another important advantage is the fact that if the reactive material containing the $CH_2=C<$ group acts as the solvent, it combines with the resin leaving no residual solvent and giving no problems as to solvent removal.

One of the outstanding advantages of these resins is quick curing time which renders them available for injection molding, blow molding, and extrusion molding.

Similar advantages are present in coating operations such as the lack of shrinkage of the film due to loss of solvent because of the combination between the reactive resin and the reactive material containing the $CH_2=C<$ group. Furthermore, the composition dries from the bottom, there are no bubbles from the solvent, and there is no water driven off. A clear, bubble-free, impervious coating is therefore more readily obtainable with the combinations of a reactive resin and reactive material containing the $CH_2=C<$ group than with other coating compositions. Since there is no solvent to be removed and since air is not needed to dry the compositions, relatively thick layers may be applied in one operation.

I claim:

1. As a new product, a resinous interpolymer obtained by polymerization of a plurality of copolymerizable materials comprising a polymerizable unsaturated alkyd resin containing a plurality of polymerizably reactive alpha,beta-enal groups and a compatible monomeric copolymerizable substance selected from the group consisting of compounds having the following general formulae:

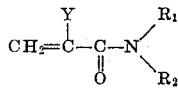

and

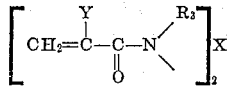

in which Y is a member of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical.

2. A product produced by interpolymerizing a mixture including a polymerizable unsaturated alkyd resin containing a plurality of polymerizably reactive alpha,beta-enal groups and methylene bis-acrylamide.

3. A product produced by interpolymerizing a mixture including a polymerizable unsaturated alkyd resin containing a plurality of polymerizably reactive alpha,beta-enal groups and N-butyl acrylamide.

4. A method of producing a new synthetic composition which comprises (1) preparing a polymerizable composition comprising a polymerizable unsaturated alkyd resin containing a plurality of polymerizably reactive alpha,beta-enal groups, a compatible monomeric polymerizable substance selected from the group consisting of compounds having the following general formulae:

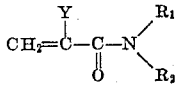

and

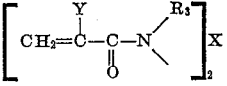

in which Y is a number of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical, and a catalyst for accelerating the copolymerization of said unsaturated alkyd resin with said substance compatible therewith, and (2) polymerizing said polymerizable composition.

5. A polymerizable composition comprising a polymerizable unsaturated alkyd resin containing a plurality of polymerizably reactive alpha,-beta-enal groups and a compatible monomeric polymerizable substance selected from the group consisting of compounds having the following general formulae:

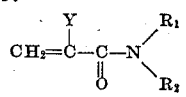

and

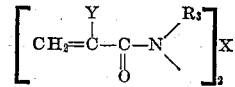

in which Y is a member of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical.

6. A polymerizable composition comprising a polymerizable unsaturated alkyd resin containing a plurality of polymerizably reactive alpha,-beta-enal groups and methylene bis-acrylamide.

7. A polymerizable composition comprising a polymerizable unsaturated alkyd resin containing a plurality of polymerizably reactive alpha,beta-enal groups and N-butyl acrylamide.

8. A polymerizable composition according to claim 5 which contains a catalyst for accelerating the copolymerization of said unsaturated alkyd resin with said polymerizable substance compatible therewith.

9. A polymerizable composition comprising an unsaturated alkyd resin obtained by reaction of ingredients comprising ethylene glycol, fumaric acid and sebacic acid, and methylene bis-acrylamide.

10. A polymerizable composition comprising an unsaturated alkyd resin obtained by reaction of ingredients comprising ethylene glycol, fumaric acid and sebacic acid, and methylene bis-methacrylamide.

11. A molding composition comprising (1) a filler, (2) a polymerizable unsaturated alkyd resin containing a plurality of polymerizably reactive alpha,beta-enal groups, (3) a compatible monomeric polymerizable substance selected from the group consisting of compounds having the following general formulae:

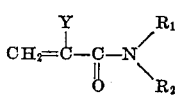

and

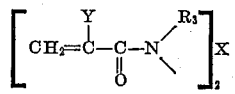

in which Y is a member of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical, and (4) a catalyst for accelerating the copolymerization of (2) and (3).

12. A shaped article comprising a filler and a copolymer obtained by interpolymerizing a polymerizable composition comprising an unsaturated alkyd resin containing a plurality of polymerizably reactive alpha,beta-enal groups and a compatible monomeric polymerizable substance selected from the group consisting of compounds having the following general formulae:

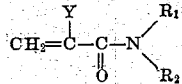

and

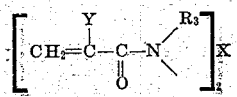

in which Y is a member of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical.

13. A coating composition comprising (1) a polymerizable unsaturated alkyd resin containing a plurality of polymerizably reactive alpha,-beta-enal groups, and (2) a compatible monomeric polymerizable substance selected from the group consisting of compounds having the following general formulae:

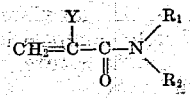

and

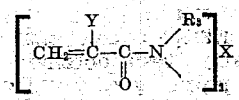

in which Y is a member of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical.

14. A laminated article comprising a plurality of sheets of fibrous material bonded together with an interpolymer of a mixture including (1) a polymerizable unsaturated alkyd resin containing a plurality of polymerizably reactive alpha,-beta-enal groups, and (2) a compatible monomeric polymerizable substance selected from the group consisting of compounds having the following general formulae:

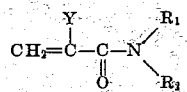

and

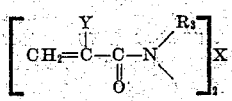

in which Y is a member of the group consisting of hydrogen and alkyl radicals of 1 to 2 carbon atoms, $R_1$ is selected from the group consisting of hydrogen and alkyl, alkylol, aryl, and aralkyl radicals, $R_2$ is selected from the group consisting of alkyl, alkylol, aryl and aralkyl radicals, $R_3$ is selected from the group consisting of hydrogen and alkyl, aryl and aralkyl radicals, and X is an alkylidene radical.

EDWARD L. KROPA.

REFERENCES CITED

The following references are of record in the file of this patent:

UNITED STATES PATENTS

| Number | Name | Date |
|---|---|---|
| 2,173,005 | Strain | Sept. 12, 1939 |
| 2,305,224 | Patterson | Dec. 15, 1942 |
| 2,407,479 | D'Alelio | Sept. 10, 1946 |
| 2,418,633 | Gould | Apr. 8, 1947 |
| 2,475,194 | Nyquist | July 5, 1949 |
| 2,475,846 | Lundberg | July 12, 1949 |

FOREIGN PATENTS

| Number | Country | Date |
|---|---|---|
| 467,402 | Great Britain | of 1937 |
| 482,897 | Great Britain | Apr. 7, 1938 |